US008468112B2

(12) United States Patent
de Kleer et al.

(10) Patent No.: US 8,468,112 B2
(45) Date of Patent: Jun. 18, 2013

(54) FACTORED ENVISIONING FOR DECISION SUPPORT

(75) Inventors: Johan de Kleer, Los Altos, CA (US); Sungwook Yoon, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 588 days.

(21) Appl. No.: 12/728,503

(22) Filed: Mar. 22, 2010

(65) Prior Publication Data

US 2011/0173147 A1    Jul. 14, 2011

Related U.S. Application Data

(60) Provisional application No. 61/183,784, filed on Jun. 3, 2009, provisional application No. 61/219,155, filed on Jun. 22, 2009.

(51) Int. Cl.
*G06F 17/00* (2006.01)
*G06N 5/02* (2006.01)

(52) U.S. Cl.
USPC .......................................................... 706/46

(58) Field of Classification Search
None
See application file for complete search history.

(56) References Cited

U.S. PATENT DOCUMENTS 5,831,853 A * 11/1998 Bobrow et al. ................. 700/86
6,983,227 B1 * 1/2006 Thalhammer-Reyero ........ 703/2

OTHER PUBLICATIONS de Kleer et al., "Foundations of Envisioning", Proceedings of the American Association for Artificial Intelligence (revised version), Aug. 16-20, 1982, p. 1-8.*
deKleer, J., Forbus, K., Hinrichs, T., Sungwook, Y., and Jones, E.K., 2009. Factored Envisioning. In Proceedings of the 23rd Annual Workshop on Qualitative Reasoning, Ljubljana, Slovenia.*
K. Forbus, "Qualitative Reasoning," CRC Handbook of Computer Science and Eng., CRC Press, Boca Raton, Fla., 1996, pp. 715-733.*
K. D. Forbus, J. Usher, and V. Chapman. Sketching for military course of action diagrams. In Proc. of IUI, 2003.*
Yannou, B. "Qualitative Design with Envisionment." Ecole Centrale de Paris, France. QR'93 Workshop, Orcas Island, WA, USA, 1993.*
D. DeCoste and J. Collins, IQE: An incremental qualitative envisioner, Working papers of the Fifth International Workshop on Qualitative Reasoning, Austin, Texas, May 1991.*
Milne, R., Trave-Massuyes, L. "Application oriented Qualitative Reasoning." The Seventh International Workshop on Qualitative Reasoning about Physical Systems p. 145-156. (1993).*
Jones, Eric K.; Tenney, Robert R.; Moore, Kendra B.; Douglas and, Joel S.; Lublin, Leonard. 2002. Battlespace Challenge Problems: Evaluation of High Performance Knowledge Bases (HPKB) Tools for Battlefield Awareness and Planning. Alphatech Inc Burlington Ma.*
Struss, P. 1997. Fundamentals of model-based diagnosis of dynamic systems. In Procs. IJCAI-97. 480-485.*

(Continued)

*Primary Examiner* — Kakali Chaki
*Assistant Examiner* — Daniel Pellett
(74) *Attorney, Agent, or Firm* — Fay Sharpe LLP

(57) ABSTRACT

A system and method provides decision support for planning in an environment where a competition for use of resources exist and events affecting the planning are occurring dynamically. A system model of an actual system is provided. Then in a dynamic factored manner, an envisionment related to at least some aspects of the system model is built. From this envisionment output is generated related to at least some aspects of the system model. Finally, changes are made to the actual system, based on the generated output thereby changing a configuration and/or operation of the actual system.

18 Claims, 10 Drawing Sheets

OTHER PUBLICATIONS

Forbus, K.D.; Mahoney, J.V.; Dill, K.; , "How qualitative spatial reasoning can improve strategy game AIs," Intelligent Systems, IEEE , vol. 17, No. 4, pp. 25-30, Jul.-Aug. 2002.*

De Kleer et al., "A Qualitative Physics Based on Confluences", 1984, Artificial Intelligence, 24(1):7-84.

Kuipers, "Qualitative Simulation", 1986, Artificial Intelligence, 29(3):289-338 (66 pages).

King et al., "Models of Defeat", 2002, Proceedings of the 2nd International Conference on Knowledge Systems for Coalition Operations, pp. 84-90.

Clancy et al.,"Model Decomposition and Simulation: A Component Based Qualitative Simulation Algorithm", 1997, in Proc. AAAI, 97, 118-124.

Donlon et al., "Using a Geographic Information System for Qualitative Spatial Reasoning About Trafficability", 1999, Proceedings 13th International Workshop on Qualitative Reasoning, Scotland.

McDermott, "A Temporal Logic for Reasoning About Processes and Plans", 1982, Cognitive Science 6(2):101-155.

Do, et al., "Sapa: A Multi-Objective Metric Temporal Planner", 2002, Journal of Artificial Intelligence Research, 20:155-194.

Pratt et al., "A Multi-Threaded and Resolution Approach to Simulated Futures Evaluation", 2008, Proceedings of the 2008 Winter Simulation Conference, IEEE, 1289-1295.

Forbus et al., "Qualitative Spatial Reasoning About Sketch Maps", 2003, Proceedings of the Fifteenth Annual Conference on Innovative Applications of Artificial Intelligence, AI Magazine, vol. 25, No. 3 (2004 (AAAI) 61-73.

Darwiche et al., "A Knowledge Compilation Map", 2002, Journal of Artificial Intelligence Research, 17:229-264.

De Kleer, "Using Model-Based Diagnosis for Bayesian Inference", 2008, The 19th International Workshop on Principles of Diagnosis, 55-62 (8 pgs.).

Forbus, "Qualitative Process Theory", Aritficial Intelligence, 1984, 24(1):85-168.

Hayes, "The Second Naive Physics Manifesto", in Readings in Qualitative Reasoning About Physical Systems, San Francisco, CA, 1990, pp. 46-63.

De Kleer, "Using Model-Based Diagnosis for Bayesian Inference", in The 19th International Workshop on Principles of Diagnosis, 2008, pp. 1-8.

* cited by examiner

| COA PROPERTIES | | | UNMERGED UNFACTORED | | MERGED FACTORED | | MERGED UNFACTORED | |
|---|---|---|---|---|---|---|---|---|
| WAR GAME | COA ACTIONS BLUE/ RED | UNITS BLUE/ RED | NUMBER OF SITUATIONS | MEAN SIZE | NUMBER OF SITUATIONS | MEAN SIZE | NUMBER OF SITUATIONS | MEAN SIZE |
| 1 | 8/0 | 2/0 | 37 | 3.1 | 13 | 1.8 | 12 | 3.2 |
| 2 | 3/7 | 3/5 | 89 | 11.3 | 23 | 1.6 | 19 | 11.8 |
| 3 | 2/5 | 8/7 | 130 | 10.7 | 18 | 1.8 | 28 | 10.1 |
| 4 | 3/5 | 7/7 | 369 | 10.1 | 41 | 1.9 | 30 | 11.2 |
| 5 | 3/5 | 16/6 | 11324 | 12.4 | 40 | 1.8 | 67 | 13.1 |
| 6 | 3/5 | 17/7 | 133,932 | 11.1 | 61 | 1.8 | 119 | 12.4 |

US 8,468,112 B2

FACTORED ENVISIONING FOR DECISION SUPPORT

INCORPORATION BY REFERENCE

This application claims the benefit of priority to U.S. Provisional Application No. 61/183,784, filed Jun. 3, 2009, entitled "Factored Envisioning For Decision Support" by de Kleer et al.; and U.S. Provisional Application No. 61/219,155 filed Jun. 22, 2009, entitled "Factored Envisioning For Decision Support" by de Kleer et al., each of which is hereby incorporated by reference in their entirety.

STATEMENT REGARDING FEDERALLY SPONSORED RESEARCH OR DEVELOPMENT

This invention was made with Government Support Under Contract Number: W 15P7T-08-C-M002 awarded by the U.S. Army/BAE Systems. The Government may have certain rights in this invention.

BACKGROUND

The present exemplary embodiments relate to Envisioning as it is understood in the Qualitative Reasoning area, and which is capable of investigating/modeling physical environments, systems and devices to produce causal explanations for behaviors of the physical environments, systems and devices. One use of the obtained explanations is to support decision making of future plans and for the execution of those plans. A useful discussion of Envisioning is set forth in the article by de Kleer, J. and Brown, J. S., 1982, "Foundations of Envisioning", *Proceedings Of The American Association For Artificial Intelligence*, 1982 Aug. 16-20, which includes a discussion of an implemented envisioning system called ENVISION. Additional envisioning discussions are set out in de Kleer, J., and Brown, J. S. 1984, "A Qualitative Physics Based On Confluences", *Artificial Intelligence*, 24(1):7-84; Forbus, K. D. 1984, "Qualitative Process Theory", *Artificial Intelligence* 24(1):85-168, and Kuipers, B. J. 1986, "Qualitative Simulation", *Artificial Intelligence*, 29(3):289-338. The foregoing articles are each incorporated by reference herein in their entirety.

Envisioning has been used extensively to model behavior of physical environments, systems, and devices. A simple example is a pressure regulator described in the de Kleer and Brown article. The modeling accomplished by Envisioning generates qualitatively distinct possible behaviors without numerically simulating every possible set of input conditions and model parameters.

Recently there has been an upsurge in research on adversarial reasoning, King G., Heeringa, B., Catalano, J., and Cohen, P., 2002, "Models Of Defeat", 85-90, *Proceedings Of The 2$^{nd}$ International Conference On Knowledge Systems For Coalition Operations;* and Kott, A. and McEneasney, W., 2007, *Adversarial Reasoning: Computational Approaches To Reading The Opponent's Mind*, Chapman and Hall/CRC, but we are aware of no prior approaches which use qualitative representations extensively or perform envisioning. Cohen's Abstract Force Simulator, King, G., Heeringa, B., Catalano, J. and Cohen, P., 2002, "Models Of Defeat", 85-90, *Proceedings Of The 2$^{nd}$ International Conference On Knowledge Systems For Coalition Operations*, uses numerical Monte Carlo simulation to identify qualitative regions in parameter spaces. Each of the foregoing articles is incorporated herein in their entirety.

Within the qualitative reasoning community, Clancy D., and Kuipers, B., 1997, "Model Decomposition And Simulation: A Component Based Qualitative Simulation Algorithm", in *Proc. AAAI,* 97, 118-124, describes a qualitative simulator, Dec-SIM which partitions a system into non-interacting collections a priori using causal ordering (this article is hereby incorporated herein in its entirety). Later versions of Dec-SIM identify non-interacting collections dynamically but focus only on eliminating "chatter" when all interactions are known a priori.

The present application applies Envisioning to the analysis of course of action (COA) diagrams to determine qualitatively distinct outcomes of actions/operations in physical environments, systems and devices.

BRIEF DESCRIPTION

A system and method provides decision support for planning in an environment where a competition for use of resources exist and events affecting the planning are occurring dynamically. A system model of an actual system is provided. Then in a dynamic factored manner, an envisionment related to at least some aspects of the system model is built. From this envisionment output is generated related to at least some aspects of the system model. Finally, changes are made to the actual system, based on the generated output thereby changing a configuration and/or operation of the actual system.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
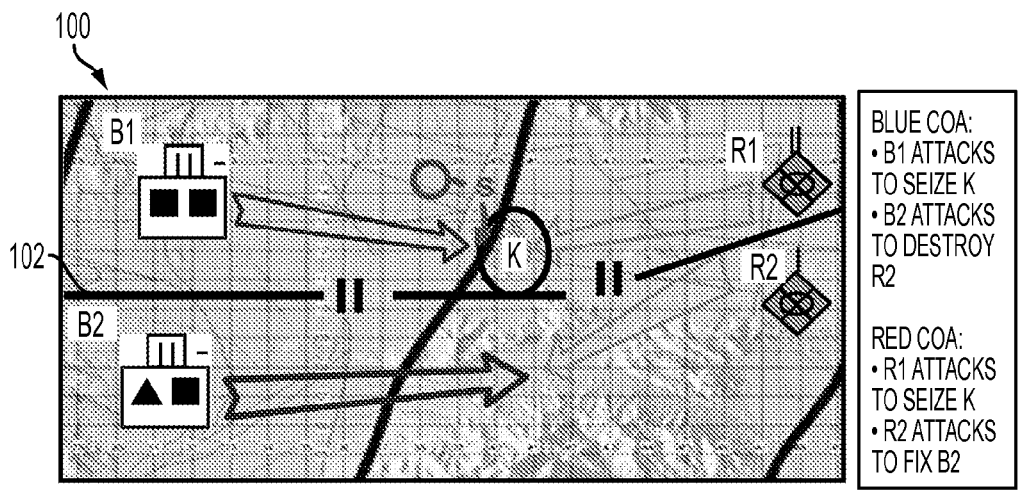
FIG. 1 illustrates a course of action (COA) that describes two independent interactions.

Referring now to the drawing figures, several embodiments or implementations of the present disclosure are hereinafter described.

1. Introduction

An issue with Envisioning as used in the area of Qualitative Reasoning is the combinatorial explosion of possible states when the environments, systems or devices being investigated and/or modeled include a substantial number of possible action/operation states. In order to avoid the combinatorial explosion of possible states, a factored envisioner of the present application factors non-interacting units into separate envisionment threads, as part of an envisionment operation. The factored envisioner may also use Assumption-Based Truth Maintenance to further limit combinatorial explosion and estimate the probability of outcomes. The following description illustrates the performance of the factored envisioner on a variety of examples, its scaling performance is analyzed, and its ability to track operations from sparse observations is demonstrated.

The discussion and examples in this document are provided primarily in the context of military planning, and are used to assist in the generation and/or updating of courses of action (COA) diagrams. It is to be understood however, these concepts are applicable to other physical environments, systems and devices. These may include disaster response, business operations, or design processes.

Turning to FIG. 1, a COA diagram 100 is described using a combination of text and graphics. COA diagram 100 describes two independent interactions: (1) Both military unit Blue (B1) and military unit Red (R1) are trying to seize a location (K), and (2) military unit Red (R2) is trying to prevent military unit Blue (B2) from moving further east. The horizontal line 102 with vertical strokes identifies a boundary. In this COA it is the intent of military units Blue (B1 and B2) that there will be no interaction across horizontal boundary 102.

Ideally, in the US Army, a commander generates several significantly distinct COAs, and wargames them against multiple COAs hypothesized for enemy forces. This wargaming process has several benefits. First, it helps find weaknesses in COAs. Second, it forces commanders and their staffs to think about what the other side might be planning, which sets up expectations that can be useful during operations. Unfortunately, this wargaming process is accomplished ad hoc and manually, making it time-consuming. Planning time is often at a premium, so shortcuts are often taken, degrading the quality of the results. Having a system and process with defined rules, and automating the support for envisioning possible futures offers valuable assistance to commanders and their staffs. By rapidly generating possible futures, advantages and/or "black swan" (which is a situation that has a very low probability of happening, but if it does, it results in very bad events) disasters could be more easily found.

It is believed the qualitative reasoning process of envisioning provides such assistance. Qualitative representations provide a natural fit to the models of military commanders, as well as of other environments, system devices where there is competition for access to resources (i.e., it is adversarial in nature). In a military context, commanders divide terrain up into functionally significant pieces, and in the early stages of planning, focus only on the actions that directly support achieving their goals, without worrying about logistics or other supporting concerns. Wargaming in military decision-making processes focus on discrete, distinct possible categories of outcomes—in other words, qualitative states. Also, the military domain is challenging as the number of "moving parts" is high, as are the actions in which those parts can participate. Also, in military situations, there is no schematic of potential future interactions, rather potential interactions in the military environment must be detected dynamically. While many engineered systems lend themselves to the development of a schematic to define in advance many potential future interactions, such systems do encounter unexpected interactions which also occur dynamically and cannot be schematically developed.

To overcome these issues, the present application describes factored envisioning, where collections of entities whose behaviors must be reasoned about together are dynamically identified and initially processed without interaction with other dynamically identified collections of entities whose behaviors must also be reasoned about together.

In the following discussion, Section 2 describes an assumed architecture and summarizes aspects of terrain reasoning that are useful to this description. Section 3 discusses the rule and COA language used in this description. Section 4 applies classic envisioning to the military domain. Section 5 illustrates why factored envisioning is necessary. Section 6 defines the particular ideas of factored envisioning. Section 7 shows how an ATMS is used to achieve scale-up. Section 8 describes how large envisionments can be represented compactly, and Section 9 illustrates implementations of the disclosure.

2. Conceptual Architecture and Terrain

A reasoner for use in physical environments, systems and devices (where dynamic states arise), may include of at least three parts: (1) an interface which supports COA entry using the standard graphical language of the environment, system, or device (e.g., in this description the standard graphical language used by the military) and the features they impose on terrain (e.g., the unit boundaries in FIG. 1); (2) an envisioner which takes a first set of COAs (e.g., the friendly or known side: Blue COAs) and a second set of COAs (e.g., the other or unknown side: Red COAs), and generates a set of qualitative states indicating all the qualitatively distinct ways that things might turn out, and (3) a tracker which, given observations during an operation, assesses which of these states the battle is in, and what COA Red is following (Blue's COA is known of course). The focus of this application is on using the factored envisioner, to compute probabilities that a tracker would need.

One of the key factors in military reasoning is terrain. In this description we use qualitative spatial representations of terrain, based on a known formalization of military terrain analysis techniques such as described by Donlon, J. and Forbus, K., 1999, "Using A. Geographic Information System For Qualitative Spatial Reasoning About Trafficability," in *Proceedings 13th International Workshop On Qualitative Reasoning*, this article is incorporated herein in its entirety. Qualitative regions are defined both within the COA and as regions implied by the COA. Examples of specifically defined COA regions include engagement areas and avenues of advance. Examples of implied COA regions include the regions where visibility and/or weapons range envelopes intersect along movements specified by the combination of Blue and Red COAs. Implied COA regions are valuable to identify because they constitute regions where interactions can occur. That is, our strategy for detecting interactions involves first finding spatial intersections, filtering those using temporal constraints to see if relevant units can be in the same place at the same time, and then considering the nature of those units and their goals (as assigned within their COAs) to ascertain what sort of interaction, if any, takes place. This strategy is exploited below, but otherwise, the details of the qualitative spatial reasoning used in this discussion are known and are not described in detail in this application.

Figure 2:
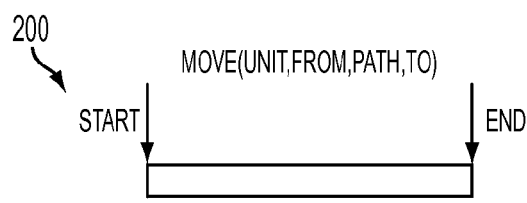
FIG. 2 illustrates a move action, depicting the action of a unit moving from a first location through a path to a second location.

Military actions are modeled in these embodiments using qualitative rules, using, for example, a Policy Description Language with Preferences (Planning Domain Definition Language (PDDL)-like), as for example as described in McDermott, D. V., 1982, "A Temporal Logic For Reasoning About Processes And Plans", *Cognitive Science* 6(2):101-155, rule language for durative actions, and Do, M. B., and Kambhampati, S., 2002, "Sapa: A Multi-Objective Metric Temporal Planer", *Journal Of Artificial Intelligence Research*, 20:155-194. Alternatively, a language based on Qualitative Process Theory (QPT), such as discussed by Forbus, K., 1984, in "Qualitative Process Theory", Artificial Intelligence, 24:85-168, may also be used. All three of these articles are hereby incorporated herein by reference in their entirety. All actions happen over time. Each action has a distinct beginning, duration and end. For example, the diagram 200 of FIG. 2 and the following pseudo code illustrate the action of a "unit" moving from a start location "from" through a path "path" to an end location "to". At the beginning of the action the unit is located at start location "from" and at the end of the action it is located at end location "to". A specific PDDL-like code listing for such an action is:

```
(:action move
  :parameters (?unit -unit ?from -location ?path -path
               ?to -location)
  :condition (and (at start (location ?unit ?from))
                  (at start (trafficable ?unit ?path))
                  (at start (path ?from ?path ?to))
                  (over all (not (underfire ?unit))))
  :effect (and (over all (location ?unit ?path))
               (over all (decreasing (distance ?unit ?to)))
               (at end (location ?unit ?to)))
  :duration :definite)
```

The identifiers, "unit", "location" and "path" are distinct types. The ":parameters" slot declares all the variables of the action and their types. ":condition" indicates properties which must hold. At the beginning of the action the moving "?unit" must be located at location "?from", the unit must be able to traverse the path (e.g., not too heavy or too wide), and the path must connect location "?from" to location "?to". Movement is severely restricted if a unit is under fire. The ":effect" slot indicates that the unit is on that path for the entire duration, the distance from the destination is constantly decreasing and (if the action is not interrupted) at the end the unit will be at location "?to". The descriptor ":definite" indicates the action has a definite end time.

The following "attack-by-fire" PDDL-like code models an attack on a location where the enemy military unit(s) may not be known. A slight extension to PDDL allows this rule to identify the enemy unit(s) "enemy". A specific PDDL-like code listing for the action attack-by-fire is:

```
(:action attack-by-fire
  :parameters (?u -unit ?from -location
               ?enemy-location -location)
  :condition (and (at start (EnemyAtLocation ?u ?enemy-location
```

-continued

```
               ?enemy))
               (over all (> (strength ?u) 0))
               (over all (location ?enemy ?enemy-location))
               (over all (location ?u ?from)))
  :effect (and (over all (decreasing (strength ?enemy)))
               (over all (underfire ?enemy))
               (at end (assign (posture ?enemy) defeated)))
  :duration :definite)
```

It is also understood the present embodiments implement rules for military tasks frequently used in COA's. This includes a set of basic tasks (e.g., movement and firing) that are commonly used in defining more complex tasks.

3. COA Language

COA's are described graphically, such as shown in FIG. 1. In a complete system, commanders enter COA's graphically on top of terrain maps by an electronic graphical tool, such as by using a Commander's Associate graphical tool which is designed to automatically convert a commander's handwritten sketch with accompanying speech of the commander's intent into a COA system as described by Pratt et al., 2008, in "A Multi-Threaded And Resolution Approach To Simulated Futures Evaluation", which is hereby incorporated by reference in its entirety. Another alternative procedure to enter COA's would be to use a system such as nuSketch Battlespace, described by Forbus, K., User, J, and Chapman, V., 2003, in "Qualitative Spatial Reasoning About Sketch Maps," in *Proceedings Of The Fifteenth Annual Conference On Innovative Applications Of Artificial Intelligence*, which is hereby incorporated by reference herein in its entirety. Only for the purposes of exposition a simple language for COA's is used, which includes the descriptions:

A ground action instance such as "(move B1 initialB1 AxisB K)". Such items are executable only if their preconditions apply.

A sequence of COA items which will be executed in order.

A "(cease <action> <actor>)" instruction may be used to explicitly terminate an ongoing action.

An "(if <condition> <coa-items>)" statement may be used as a decision point.

In this simple COA language the top half of FIG. 1 is described by:

(move B1 initialB1 AxisB K)
(seize B1 K)
(move R1 initialR1 AxisR K)
(seize R1 K)

4. Classical Envisioning

Figure 3:
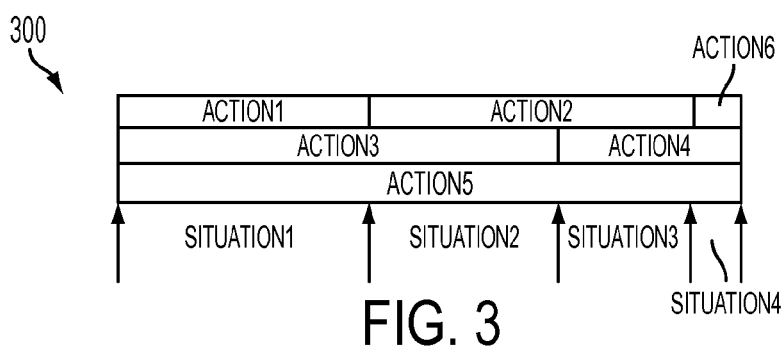
FIG. 3 is a qualitative reasoning chart illustrating that many actions can take place simultaneously.

In qualitative reasoning one of the most common ways to represent time is as instants, separated by open intervals, much like a real world time line. Each action has a distinct beginning and end. Many actions can take place simultaneously. As illustrated by graph 300 of FIG. 3, a "situation" is understood to be a bundle of ongoing actions. Thus, actions 1-6 may be included in various ones of the four situations (situation 1-situation 4), where some actions may be associated with more than one situation. The start time of a situation is the latest of all the start times of all its actions. The end time of a situation is the earliest end time of all its actions. Predicates (except "location") are constant over the duration of a process. Quantities (Q) are presumed to change monotonically over time.

The classical envisioning process generates a graph of situations which describes all possible qualitatively distinct possible evolutions of a system. Conventional envisioners, such as described by the incorporated by reference articles by de Kleer & Brown [1982], de Kleer & Brown [1984], Forbus

Figure 4:
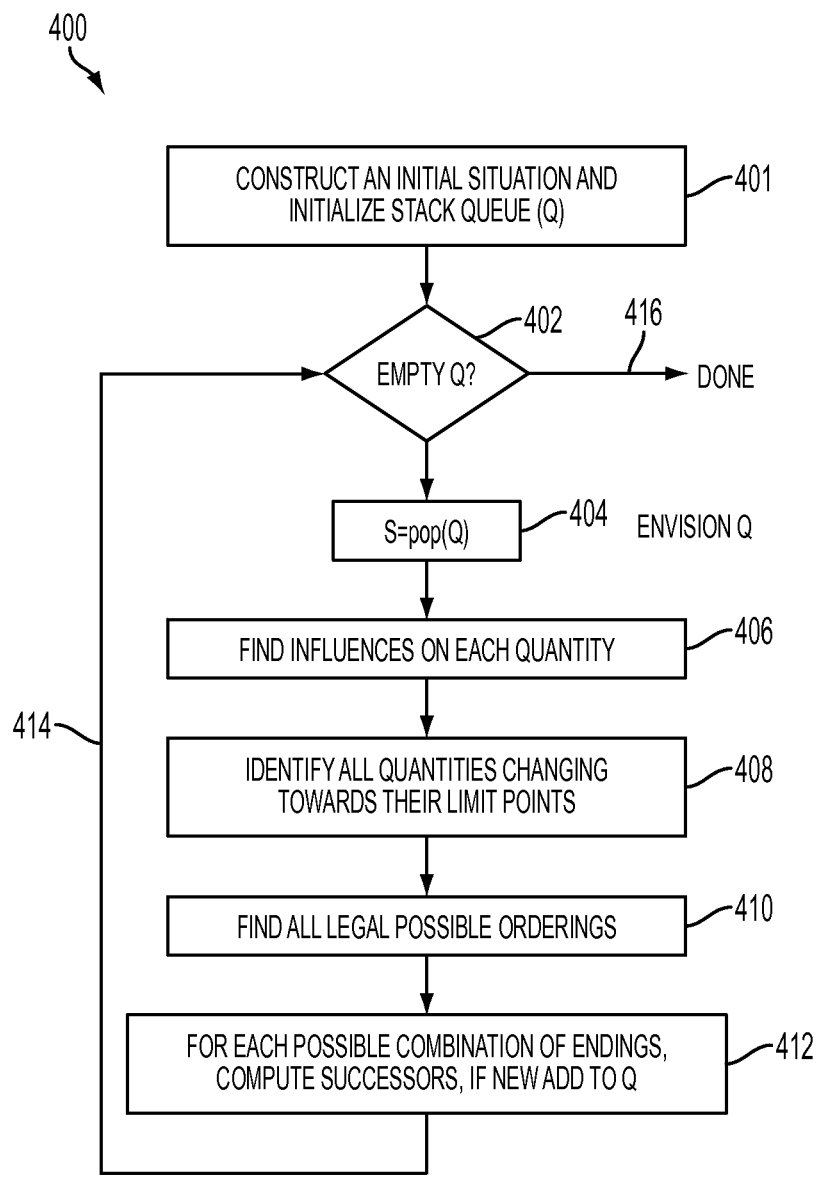
FIG. 4 is a flow diagram illustrating a classic envisioning loop, where Q is initialized to the initial situation.

[1984], and Kuipers [1986], operates as illustrated in the flow diagram 400 of FIG. 4 and summarized below:

1. Construct an initial situation and set quantities in queue (Q) to an initial state (e.g., number of units in COA) (step 401).
2. Check quantity in queue (Q) 402.
3. Take and remove (i.e., pop) the first situation S from queue Q. (step 404).
4. Determine the combined influences on each quantity (step 406).
5. Identify all quantities that are changing towards their limit points (step 408).
6. Find all legal possible orderings for those quantities to reach their limit points. In worst case if there are n changing quantities there may be $2^n$ possible endings. Typically only a small subset of the combinations will satisfy the conditions (step 410).
7. For each possible ending, compute the next possible situation by (1) terminating actions which naturally end or whose preconditions no longer hold (interrupted actions), (2) starting any new actions whose preconditions now hold, (3) adding the new transition to the envisionment, and (4) if the destination of the transition is new, add it to Q. (step 412).
8. Return to step 402 (via return line 414) and continue process if more, i.e., Q is non-empty.
9. If Q is empty, process is done (step 416).

Figure 5:
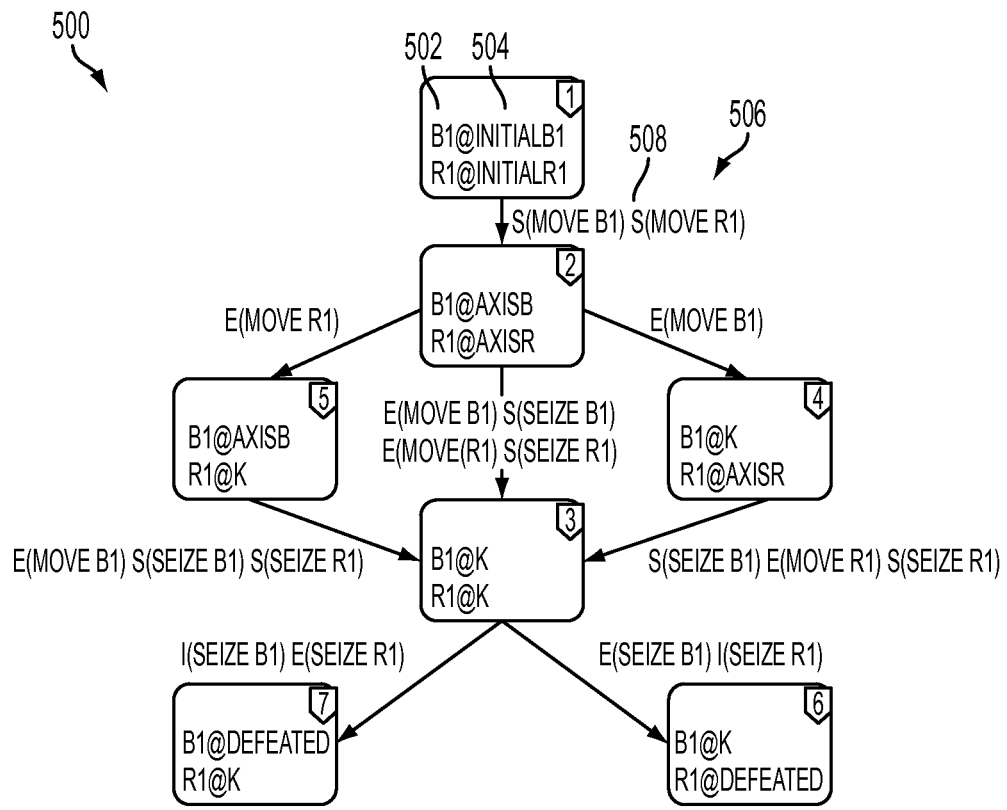
FIG. 5 is an envisionment chart of R1 and B1 for the COA diagram of FIG. 1.

Turning to FIG. 5 illustrated is a resulting envisionment chart 500 resulting from classical envisionment applied to COA diagram 100 of FIG. 1. Envisionment graph 500 includes Nodes 1-7 labeled by their identification (e.g., 502—which identifies unit B1) and operating unit locations (e.g., INITIALB1 504 or they are noted as being DEFEATED). Corresponding edges 506 are labeled by actions (e.g., starting (S), ending (E) or interrupted (I)) 508. Envisionment graph 500 is constructed as follows:

1. Two new actions (i.e., B1@initialB1 and R1@initialR1) start in the situation defined in Node 1 and its edge label, i.e., (S(moveB1) S(moveR1)): B1 and R1 simultaneously start moving to location K (by decreasing their distance from their endpoints).
2. In the situation defined in Node 2 and its edges R1 and B1 are moving along their respective avenues of advance. This situation can end in three possible ways:
3. The situation defined by Node 4 and its edges describes the case when B1 arrives at K first.
4. The situation defined by Node 5 and its edges describes the case when R1 arrives at K first.
5. The situation defined by Node 3 and its edges describes the case when R1 and B1 arrive at K simultaneously.
6. The situations defined by Nodes 2, 4 and 5 and their edges all lead to a common situation at Node 3 where both B1 and R1 fight. As both are reducing the strengths of the other, there are two possible outcomes: either R1 or Bis strength reduces to 0 (in many cases units disengage before at some limit point greater than 0). The probability of an outcome depends on many factors, including the arrival time. If B1 arrives early, then its probability of winning would be higher.
7. The situation defined by Node 6 and its edges is where B1 wins.
8. The situation defined by Node 7 and its edges is where R1 wins.

5. Why Factored Envisioning is Needed

Figure 6:
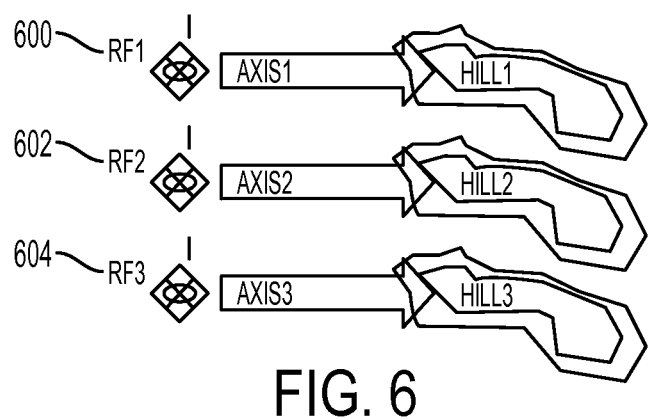
FIG. 6 is a simple COA diagram used in the demonstration of factored envisioning of the present application.

Consider the COA 600, 602 and 604 illustrated in FIG. 6. In accordance with the defined nomenclature, they may be described as:

(move RF1 initialRF1 Axis1 Hill1)
(move RF2 initialRF2 Axis2 Hill2)
(move RF3 initialRF3 Axis3 Hill3)

The above identifies the three units RF1, RF2 and RF3 are to move along separate paths (Axis 1-Axis 3) to arrive at separate hills (Hill 1-Hill 3).

Figure 7A:
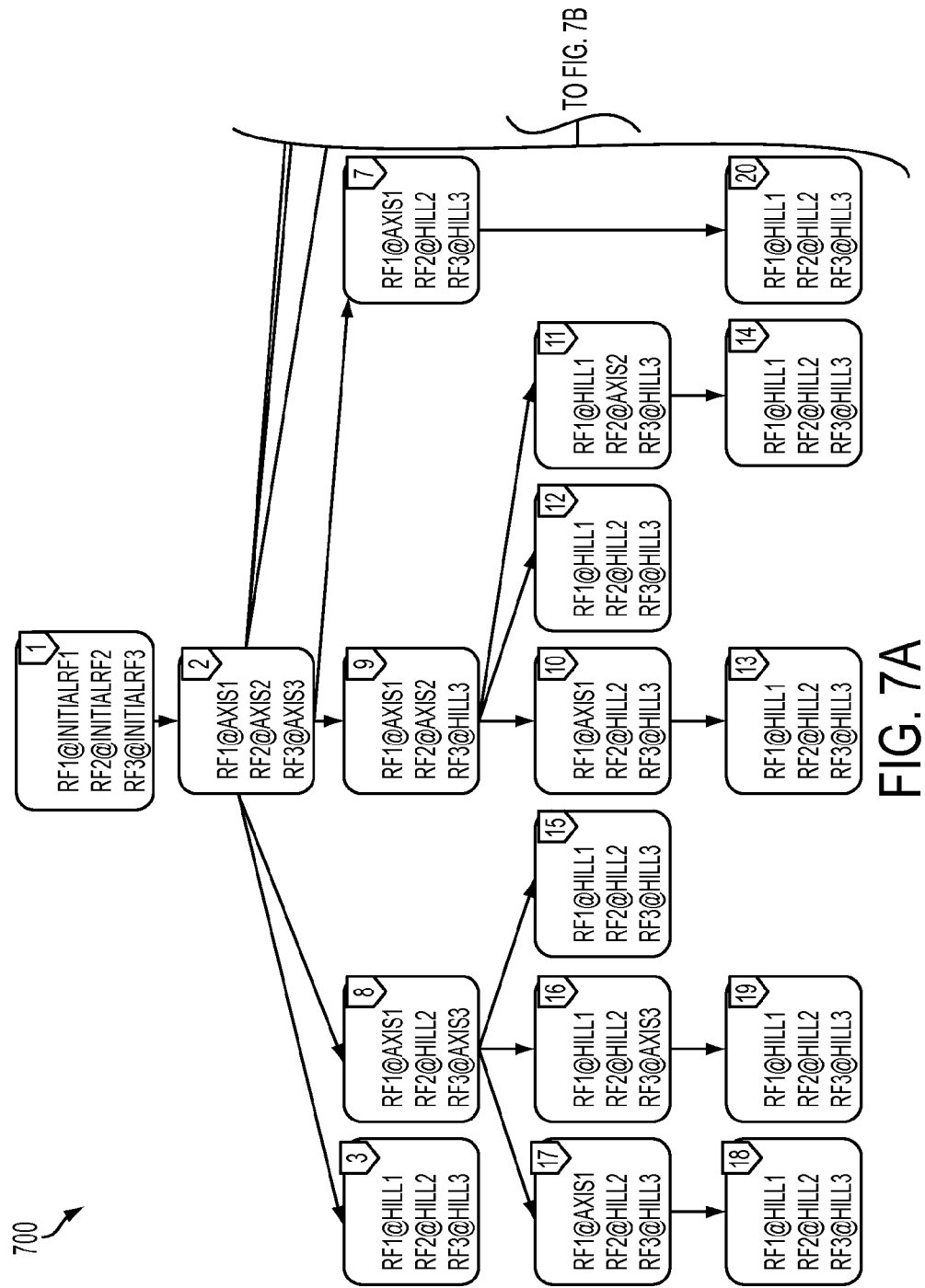
FIGS. 7A-7B depict the graph for a situation of three non-interacting actions of FIG. 6 leading to 26 situations without situation merging of factored envisioning.
Figure 7B:
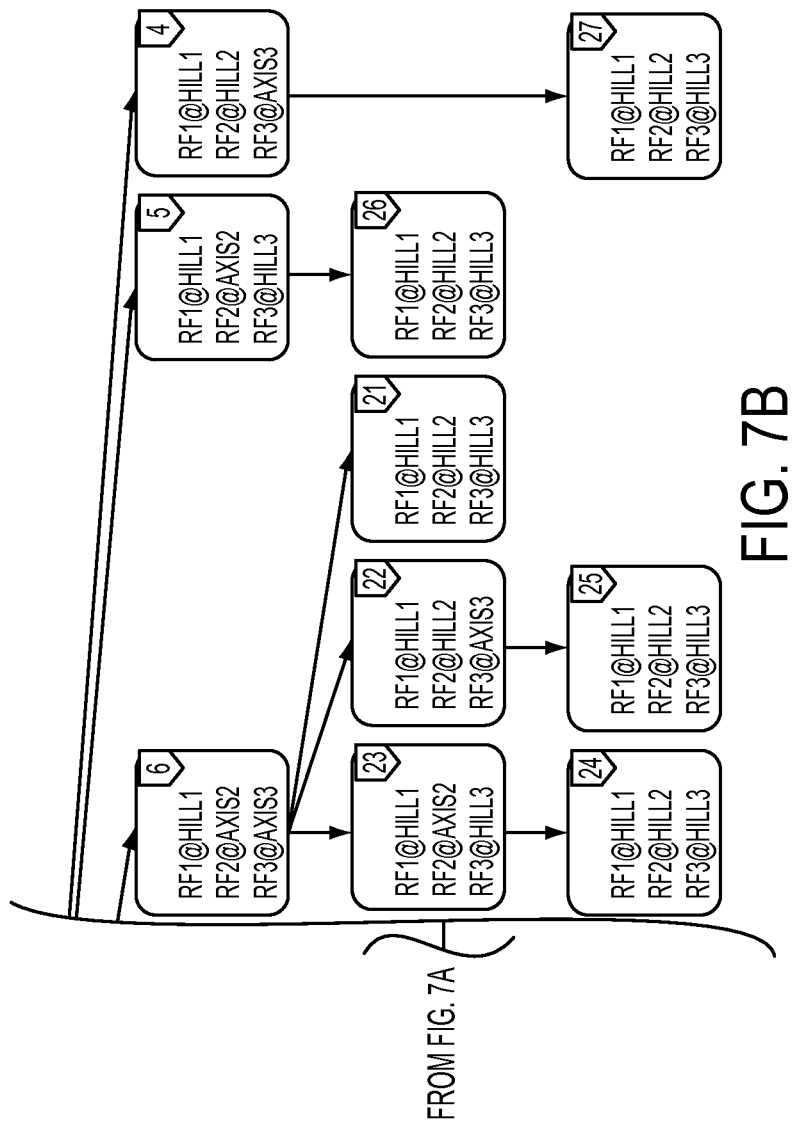

Performing conventional envisionment, the resulting envisionment graph 700 consists of 26 situations represented by Nodes 1-26. FIG. 7 shows that three (3) non-interacting actions leads to 26 situations without situation merging. For clarity, edge labels have been omitted. In situation 1 (e.g., Node 1), RF1, RF2, RF3 start moving to their destinations. In situation 2 (Node 2), all actions are on-going and the question is only when each will end, or put another way, which situation reaches its destination first. Given n independent actions, there are $2^n-1$ possible combinations of ending options One approach to reducing the size of an envisionment is to merge qualitatively equivalent situations. For example, the 26 situation envisionments of FIGS. 7A-7B can be reduced to the 9 situation envisionments of FIG. 8. The path taken through a merged envisionment can be important. Later we describe how the ATMS is used to record the important choices along a path.

One of the central tenets of qualitative reasoning is to only make distinctions which matter. This applies to envisionments as well. As RF1, RF2 and RF3 do not interact, envisionment graph 700 of FIGS. 7A-7B makes many needless distinctions. Factored envisioning of the present application avoids grouping actions that do not interact. In factored envisioning, each situation describes a potentially partial description of the world, and each set of actions is grouped into situations which only interact with each other.

Figure 8:
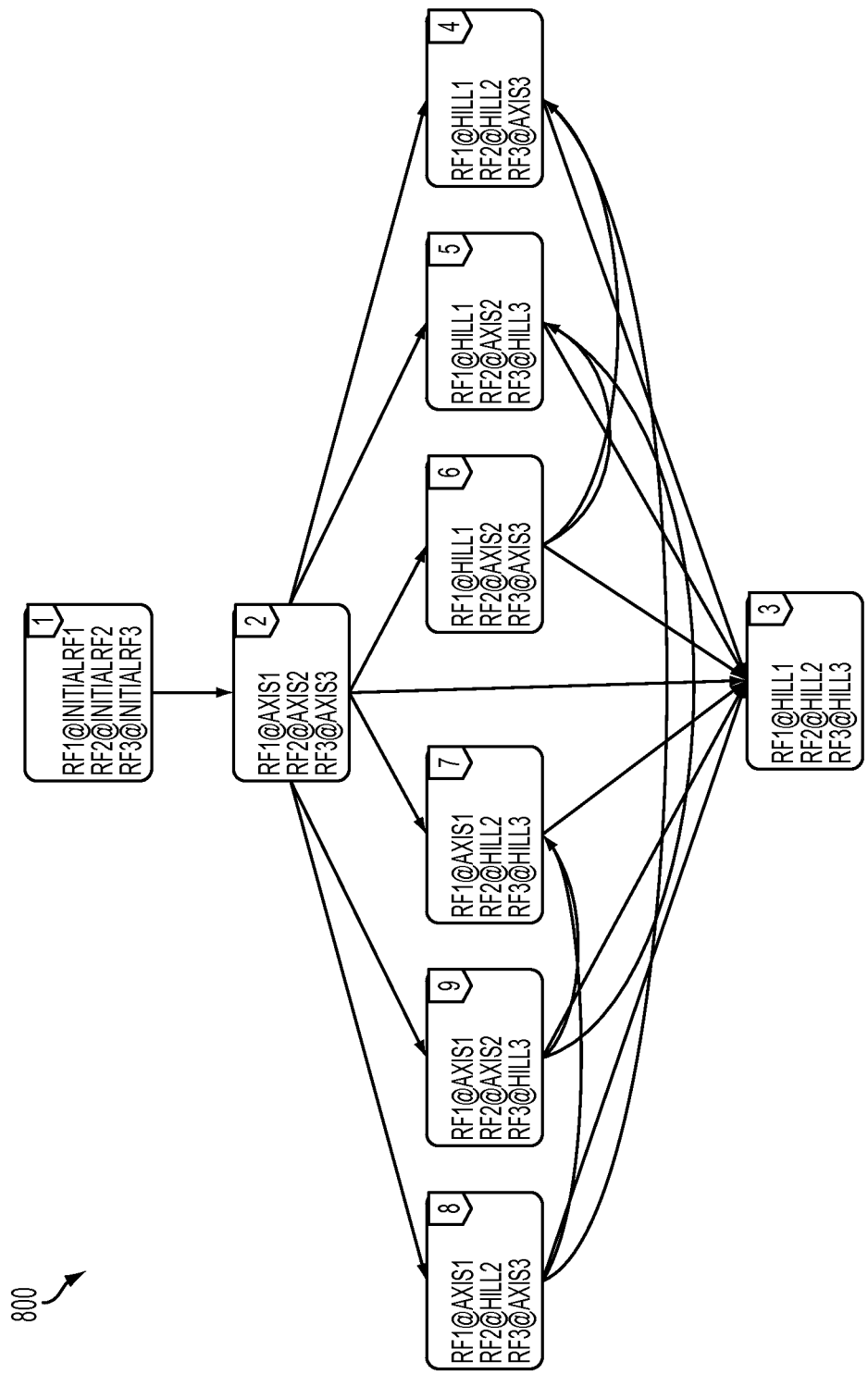
FIG. 8 depicts the chart of FIG. 7 with situation merging, causing the 26 situations to be reduced to 9 situations.

FIG. 8 illustrates graph 800, wherein with situation merging the 26 situations of FIG. 7A-7B are reduced to 9 situations represented by Nodes 1-9.

6. Factored Envisioning

A particular aspect of factored envisioning is its ability to avoid the irrelevant overspecificity and needless exponential explosion in situations. In factored envisioning, two properties of situations are introduced. First, a complete situation describes the positions and actions of all units in an environment system or device (e.g., on a battlefield). Second, a kernel situation describes the positions and actions of some (e.g., a subset) of the units in the environment, system or device with an additional condition: every unit within the kernel situation interacts with every other unit in a kernel situation (perhaps transitively). In other words, a kernel situation includes a requirement that all units within the kernel situation must interact with any other unit in the kernel situation. Intuitively, a kernel situation is the smallest set of interacting units possible. In the envisionment 500 of FIG. 5 situation 3 (e.g., represented by Node 3) is the only kernel situation as both units B1 and R1 are interacting/intersecting. All the situations are complete. None of the situations in FIGS. 7A-7B are kernel situations.

Figure 9:
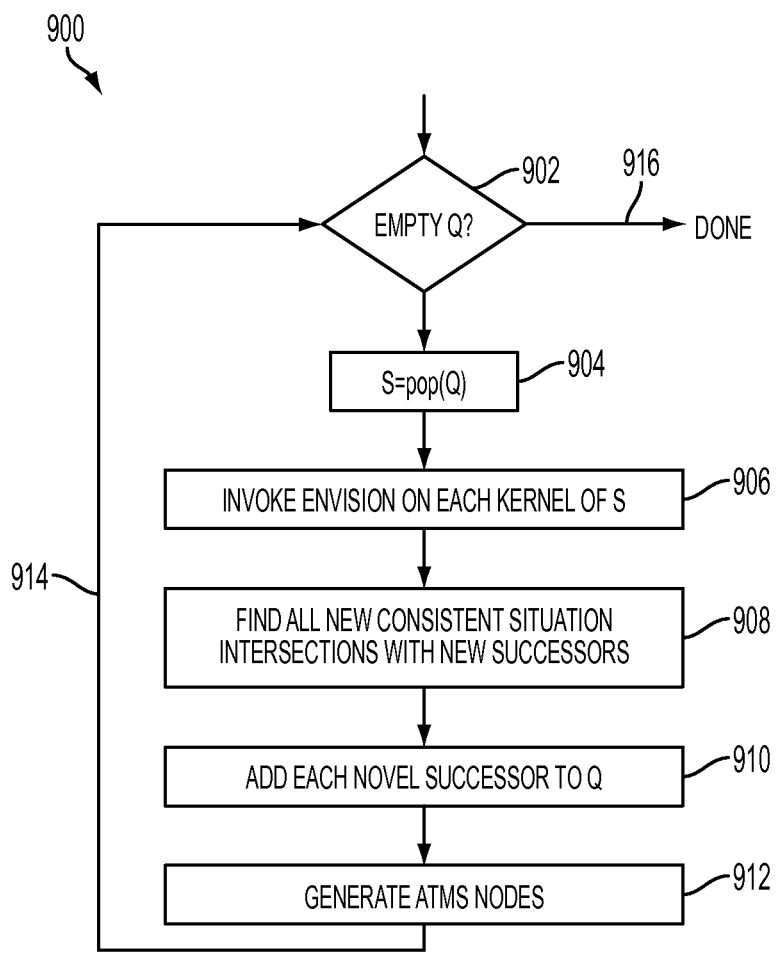
FIG. 9 is a process flow for a factored envisioning loop, where Q is initialized to an initial state.

Factored envisioning uses conventional envisioning as a subprocedure. Intuitively, factored envisioning proceeds according to factored envisioning process 900 of FIG. 9, with Q initialized to only contain the initial situation (step 902). A complete situation is partitioned into non-interacting kernel situations (step 904). The conventional envisioner is invoked on each kernel situation individually, with every other unit kernel situation of the COA is withheld (e.g., hidden) from the conventional envisioner. This process is repeated for every kernel situation (step 906). This processing produces a set of space-time tubes or histories (step 908), as for example described in Hayes, P. J., 1990, "The Second Naive Physics Manifesto", in Readings In Qualitative Reasoning About Physical Systems, San Francisco, Calif., US; Morgan Kauffmann Publishers Inc., 46-63, which is hereby incorporated by reference herein in its entirety. The set of space-time tubes or histories reveal a set of possible space-time intersections between units within separate kernel situations. For example, units from the different kernel situations may be found to arrive at the same location (i.e., be accessing the same resource). For every possible space-time intersection, the factored envisioner constructs a new combined kernel situation (step 910). At this point, ATMS Nodes are generated (step 912), as will be explained in Section 7. Then the process is returned (via line 914), to step 902, and the process is repeated, including invoking the conventional envisioner on this combined kernel situation to see if still further new possible interactions result (this may result in the construction of a new location), until all processing is completed (step 916). In one embodiment, the process will test for intersections first by space and then by time. In other embodiments, it would be by time and then space.

Figure 10:
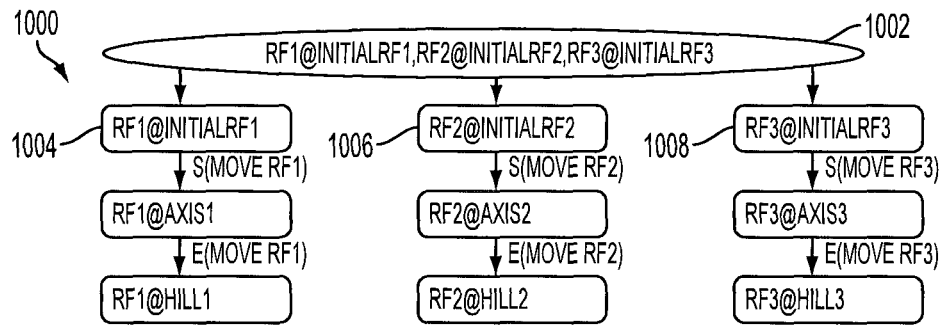
FIG. 10 is a simplified factored envisionment for the COA diagram of FIG. 6.

FIG. 10 depicts a factored envisionment graph 1000 for the COAs of FIG. 6. In FIG. 10, the elliptical top node 1002 depicts a complete situation node comprised of three kernel situations (RF1 . . . , RF2 . . . and RF3 . . . ), as seen in the three illustrated non-interacting kernel situations 1004, 1006 and 1008

Figure 11:
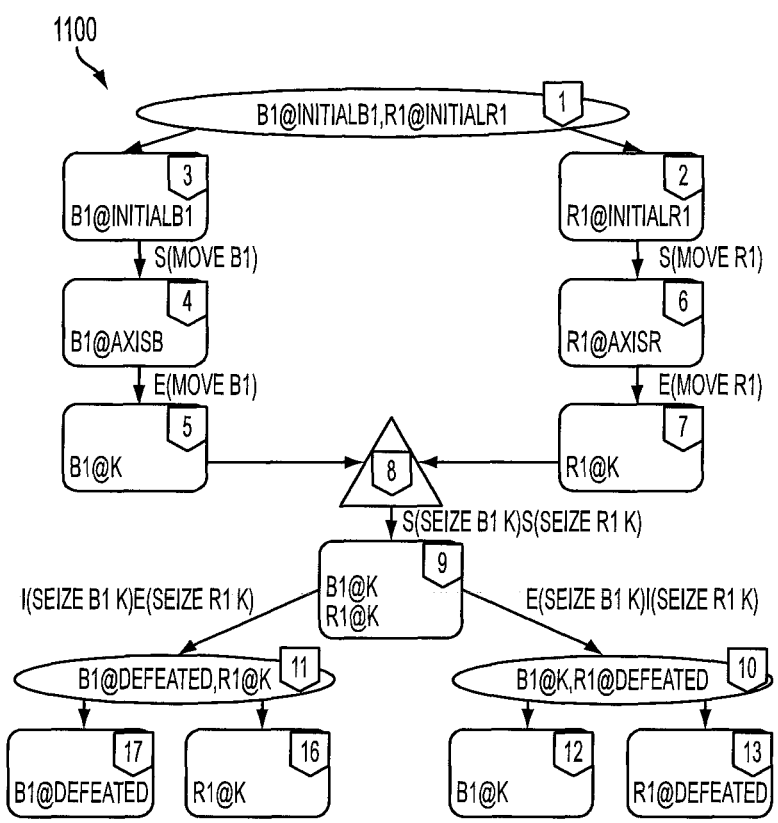
FIG. 11 is kernel envisionment with a merging (intersecting) node for the COA diagram of FIG. 6.

Kernel envisionment graph 1100 of FIG. 11 describes the factored envisionment of the COA from FIG. 1. Elliptical node 1 is comprised of two kernel situations (B1@initialB1 and R1@initialR1). The kernel situation (as defined in Nodes 2, 6, 7) 7 describes the movement of unit R1. The kernel situation defined in Nodes 3, 4, 5 describes the movement of unit B1. Non-action node 8 depicts the joining of the two kernel situations and Node 9 depicts the battle. The battle has two outcomes one in which unit R1 wins and another in which unit B1 wins. Elliptical nodes 11 and 10 contain two kernel situations each defining these outcomes. Each node in the factored envisionment graph 1100 only describes a small local state of affairs, this feature is one of the reasons the factored envisioning of the present application produces dramatic improvements in envisioning performance and subsequent analysis (as discussed in Section 8). The triangle node (Node 8) is a non-situation to describe that kernel situations represented by Note 7 and Node 5 interact. There are no other interactions.

7. Using an ATMS

In performing factored envisionment of the present application areas of ambiguity may arise when processing the situations, and the processing may also require evidential reasoning capabilities. In one embodiment, the factored envisionment addresses these issues by implementation of a probabilistic Assumption-Based Truth Maintenance System (ATMS) to represent the ambiguities and perform all the needed evidential reasoning. A particular form of probabilistic ATMS (PATMS) that may be used is described by de Kleer, J., 2008, in "Using Model-Based Diagnosis For Bayesian Inference", in *The 19th International Workshop On Principles Of Diagnosis*, 55-62 (incorporated by reference herein in its entirety). The PATMS is a direct extension of the ATMS allowing one to compute the probabilities of nodes. Hence ATMS nodes are PATMS nodes.

As applied to the present system and/or process, each situation and transition is represented by a unique ATMS node. Consider the classical envisionment of FIG. 5. An ATMS node s1 is created to represent situation described in Node 1 (B1@initialB1, R1@initialR1), s2 is created to represent next situation represented by Node 2 (B1@AxisB, R1@AxisR) and t1 is created to represent transition from Node 1 to Node 2. The following two justifications are added to the ATMS:

$$s1 \rightarrow t1,$$

$$t1 \rightarrow s2.$$

However, there are 3 possible transitions from the situation represented by Node 2 corresponding to the cases where B1 or R1 reaches K first or together. These possibilities are represented as follows. Usual ATMS nodes are created to represent the three outcomes and transitions to them (i.e., s3, s4, s5, t3, t4, t5) in addition, three assumptions (A3, A4, A5) are created to encode the exclusive disjunction of the alternatives.

$$s2 \wedge A3 \rightarrow t3,$$

$$s2 \wedge A4 \rightarrow t4,$$

$$s2 \wedge A5 \rightarrow t5,$$

$$t3 \rightarrow s3,$$

$$t4 \rightarrow s4,$$

$$t5 \rightarrow s5,$$

$$\text{oneof}(A3, A4, A5).$$

In addition, a probability is assigned to each assumption. In the military environment, this probability may be computed using a more detailed model which considers speed of the units and the terrain they have to cover to reach K. The outcome of the battle (situation 3) depends both on the path taken to reach K, and the properties of the units. Again two assumptions are created to represent both outcomes. The probabilities of these assumptions are derived from the more detailed military models.

As a result of this justification structure the ATMS constructs a label for each node. This label consists of minimum sets of assumptions that can be used to derive that node given the justifications. This label takes the form of prime implicates and is a d-DNNF (deterministic decomposable negation normal form) expression, as, for example, described in Darwiche, A., and Marquis, P., 2002, "A Knowledge compilation Map", in *Journal Of Artificial Intelligence Research*, 17:229-264 (hereby incorporated by reference herein in its entirety). The probability of any node can be directly derived from its label:

$$p(x) = \sum_{e \in label(x)} p(e),$$

and, $$P(A_1, \ldots, A_n) = \Pi A_i$$

Thus the PATMS directly computes the prior probability of every situation.

Of far greater importance for planning is the conditional probability of reaching some objective B from situation A. This can be directly computed from the PATMS by:

$$P(B \mid A) = \frac{P(A \wedge B)}{P(A)}$$

There may be multiple situations which achieve a commander's intent. The most useful measure of a situation's desirability is its expected utility:

$$EU(S) = \sum_F U(F)P(F \mid S).$$

(U is usually only non-zero for end-states.) Although probabilities are well-defined all types of situations, utility is only well-defined for complete situations. Blind alleys or "black swan" events are situations with significant conditional probability but with very low expected utility.

ATMS assumptions are also used to keep results of different COA pairs distinct while eliminating redundant envisioning. An assumption is created for every COA to represent "This COA is being executed." Thus, if there are 3×3 COAs, 6 assumptions are created. The three assumptions for each side are mutex (expressed as "oneof" in the ATMS). These assumptions have the prior probability of the particular COA. (However, in most cases the commander is interested in the conditional properties so the prior on a root is not that relevant.)

8. Packing

Figures 12, 13:
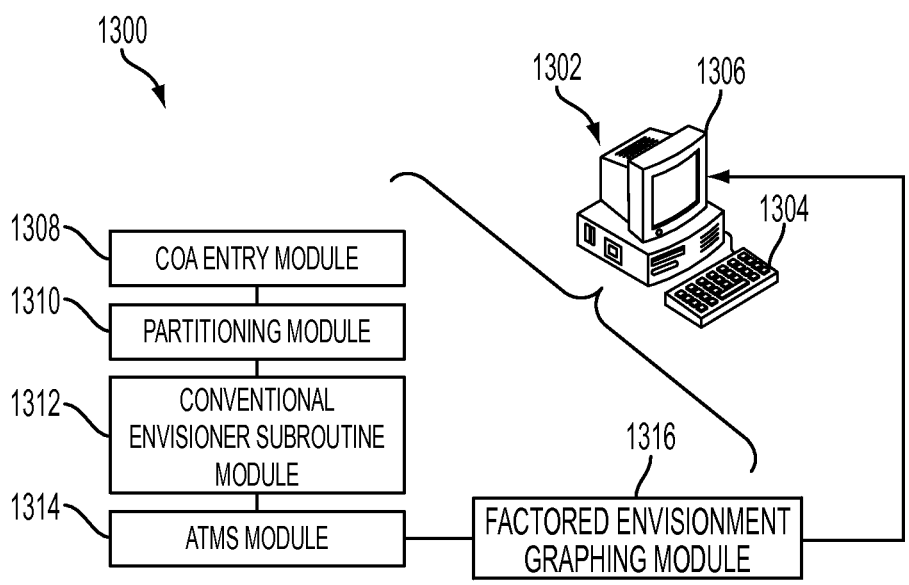
FIG. 12 depicts future graph sizes comparing unmerged, unfactored situations with merged and factored situations, and merged and unfactored situations.
FIG. 13 depicts a factored envisioning engine.

In order to avoid combinatorial explosion in situations it is important to detect qualitatively similar situations. There will often be multiple paths to reach a particular situation. Every situation will have an ATMS node. FIG. 12, which shows a future graph size makes the case for "Merged Factored" futures graphs. On the vertical axis of FIG. 12 are 6 war games and their characteristics. "Unmerged Unfactored" is the number of (complete) situations generated and their mean size. The size of a situation is the number of facts (e.g., actions) in the base knowledge representation needed to completely represent the non-inherited facts of the situation (e.g., unit composition is inherited). So mean size is the average number of knowledge representation assertions that completely describe a (the variable parts of) situation. The mean size is therefore a measure of how much memory is needed. "Merged Factored" is the number of kernel situations and their mean size. The final column "Merged Unfactored" is the number of complete situations and their mean size.

9. Implementations

With reference to FIG. 13, a factored envisionment engine 1300 is described. The factored envisionment engine 1300 is suitably embodied by a computer 1302 or other digital processing device including a digital processor such as a microprocessor, microcontroller, graphic processing unit (GPU) or so forth and storage. In other embodiments, the factored envisioning engine may be embodied by a server including a digital processor and including or having access to digital data storage, such server being suitably accessed via the Internet or a local area network, or by a personal data assistant (PDA) including a digital processor and digital data storage, or so forth. The computer 1302 or other digital processing device suitably includes or is operatively connected with one or more user input devices such as an illustrated keyboard 1304 for receiving user input to control the factored envisioning processing, and further includes or is operatively connected with one or more display devices such as an illustrated display 1306 for displaying output generated based on the output of the factored envisioning engine. In other embodiments, the input for controlling the factored envisioning process is received from another program running previously to or concurrently with the factored envisioning engine on the computer 1302, or from a network connection, or so forth. Similarly, in other embodiments the output may serve as input to another program running subsequent to or concurrently with the factored envisioning engine on the computer 1302, or may be transmitted via a network connection, or so forth. The factored envisionment engine 1300 includes COA entry module 1308, which includes the complete situation of the COA. A partitioning module 1310 receives the complete situation and generates or constructs the non-interacting and/or non-intersecting kernel situations that are then acted upon by the conventional envisionment sub-routine module 1312. Operation of conventional envisionment sub-routine module 1312 provides selected conventional envisionment processing of the kernel situations and the newly combined kernel situations, where the conventional envisionment sub-routine module 1312 operates only on a single kernel situation, or newly combined kernel situation, at a time. ATMS module 1314 provides solutions to ambiguities and evidential reasoning nodes corresponding to nodes of the kernel situations and newly combined kernel situations. The conventional envisionment repeatedly processes the situations until all potential situations have been identified. Following operation of modules 1308-1304, a graph generating module 1316 generates the factored envisionment graph which may be supplied for display, printout and/or implementation into additional decision making mechanisms such as planners, etc.

In some embodiments, the disclosed factored envisioning processes, factored envisioning engines employing same, and so forth are embodied by a storage medium storing instructions executable (for example, by a digital processor) to implement a factored envisioning method, engine, or so forth. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

Figure 14:
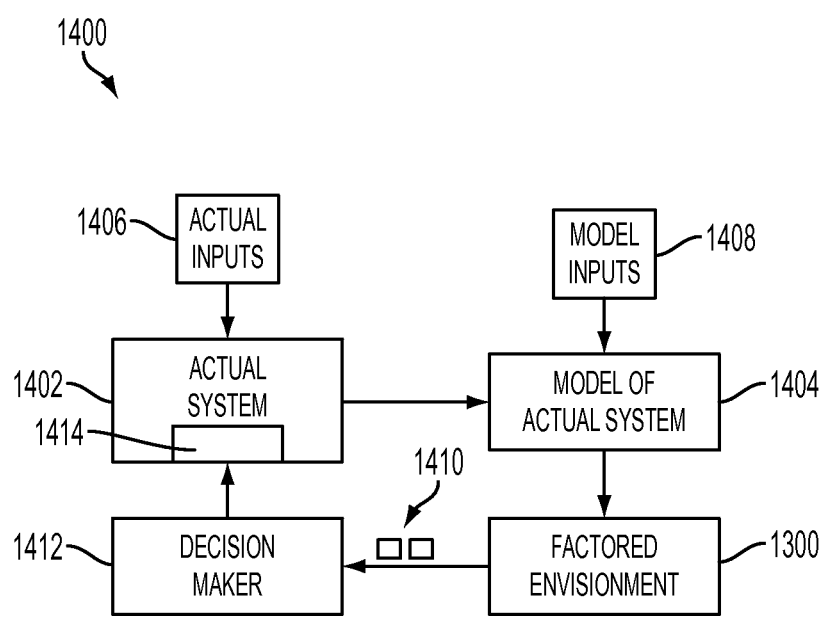
FIG. 14 is a schematic diagram illustrating a production system and an exemplary model-based control system with a planner, a plant model, a diagnosis engine, and a operator interface in accordance with one or more aspects of the disclosure.

Turning to FIG. 14, illustrated is system 1400, which employs the factored envisioner 1300 of FIG. 13.

It is to be appreciated the prior description has mainly focused on the concept of employing factored envisioner 1300 in military situations. However, as previously mentioned, factored envisioning may be employed in other environments or situations to enhance the qualitative simulation of actual systems. While researchers prior to this disclosure have described many different types of envisioners, some of which have been referenced in this application, the present application now provides dynamic factoring to the envisionment process. This dynamic factoring in an envisionment process may be used to improve a variety of real world and/or physical systems, also called herein actual systems. For example, its application to manufacturing allows factories to more efficiently allocate assets in the factory, such as production machinery, human resources, logistics and energy allotment, among others. The described concepts also find use in devices having multiple components (e.g., printer/copiers/fax machines, etc.) for allocating the operation of individual component's operation and/or interaction with other components of such devices. Still other real world areas where such envisionment has application would be social environments, including but not being limited to hospitals, educational institutions, among others. Again, areas where there is a competition for limited resources.

Thus, FIG. 14 depicts a block diagram of how such systems may use the factored envisioning system 1300 of the present application. More particularly, an existing actual system 1402 is modeled 1404. Actual inputs 1406 are provided to actual system 1402, in a dynamic fashion, and model inputs 1408 are similarly added to the model of the actual system 1404. Model 1404 is provided to and acted upon by the factored envisionment system 1300, which generates outputs 1410. These outputs are then provided to a decision maker 1412, which may be an automated device that makes selections based on the output 1410, or a human user may receive the output 1410. In either case, based on the received output 1410, the decision maker 1412 adjusts operation of the actual system 1402. For example, in a factory creating some product, operation of the changes from decision maker 1412 are input 1414 into the actual system 1402, thereby adjusting/changing the configuration and/or operation of the actual system 1402.

The above examples are merely illustrative of several possible embodiments of the present disclosure, wherein equivalent alterations and/or modifications will occur to others skilled in the art upon reading and understanding this specification and the annexed drawings. In particular, the present concepts have been described in connection with "units" as being military units moving around a terrain, wherein terrain is a physical geographic location on maps. However, the concepts defined herein may also be used in other environments, such as in determining procedures in the field of medicine, sports, as well as in production facilities as described above. Therefore "unit" is understood to have a broad meaning, including but not limited to devices being built (e.g., computers, refrigerators) and jobs being processed (e.g., printing jobs, packaging jobs, as well as the logistics of sending objects and products to different locations).

It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art.

The invention claimed is:

1. A method of providing decision support for planning in an environment where a competition for use of resources exist and events affecting the planning are occurring dynamically, the method comprising:
   providing a system model of an actual system;
   building, in a dynamic factored manner, an envisionment related to at least some aspects of the system model, wherein the building of the envisionment includes:
      constructing a plurality of kernel situations from complete situations of the system model, wherein each kernel situation does not interact with any other kernel situation;
      invoking a conventional envisioner to process each constructed kernel situation individually, wherein the conventional envisioner sees only the kernel situation it is presently processing and the processing identifies any new combined kernel situations, wherein new combined kernel situations occur when, after being processed, at least two different kernel situations have an intersection and/or interaction;
      invoking the conventional envisioner to process each new combined kernel situation individually, wherein the envisioner sees only the new combined kernel situation it is processing, and wherein the processing is repeated for all new combined kernel situations; and
      generating a factored envisioning graph including all processed kernel situations and new combined kernel situations;
   generating output based on the envisionment related to at least some aspects of the system model; and
   making changes to the actual system, based on the generated output, thereby changing a configuration or operation of the actual system.

2. The method according to claim 1, wherein the kernel situations are determined dynamically, as all possible intersections and/or interactions are not determined a priori.

3. The method according to claim 1, further including:
   representing ambiguities and performance of all needed evidential reasoning by a probabilistic Assumption-Based Truth Maintenance System (ATMS).

4. The method according to claim 3, wherein the model of the physical system includes a plurality of course of actions (COAs) diagrams and the method further includes creating an ATMS assumption for every COA, using the ATMS assumptions to keep results of different COA pairs distinct while eliminating redundant envisioning.

5. The method according to claim 1, wherein the kernel situations are constructed by partitioning of the complete situation into kernel situations in a manner to limit the likelihood of combinatorial explosions in the processing by the conventional envisioner.

6. The method according to claim 1, wherein the factored envisioning is a stochastic approach which determines a next few steps in a process and not the final results of the process.

7. The method according to claim 1, wherein each kernel situation includes actions, and at least some actions in the kernel situations are transitive interactions.

8. The method according to claim 1, wherein each kernel situation includes actions, and in each kernel situation sets of actions are grouped into situations which only interact with each other.

9. The method according to claim 1, further including:
   moving the envisioner back and forth between the complete non-kernel situation and the kernel situations.

10. The method according to claim 1, wherein each kernel situation describes a potential partial description of the complete situation.

11. A system comprising:
    one or more electronic processors configured to perform a factored envisioning process defined by the following operations:
       constructing a plurality of kernel situations from complete situations of a system model, wherein each kernel situation does not interact with any other kernel situation;
       invoking a conventional envisioner to process each constructed kernel situation individually, wherein the conventional envisioner sees only the kernel situation it is presently processing and the processing identifies any new combined kernel situations, wherein new combined kernel situations occur when, after being processed, at least two different kernel situations have an intersection and/or interaction;
       invoking the conventional envisioner to process each new combined kernel situation individually, wherein the envisioner sees only the new combined kernel situation it is processing, and wherein the processing is repeated for all new combined kernel situations; and
       generating a factored envisioning graph including all processed kernel situations and new combined kernel situations.

12. The system according to claim 11, wherein the kernel situations are determined dynamically, as all possible interactions are not determined a priori.

13. The system according to claim 11, wherein the factored envisioning process further includes:

representing ambiguities and performance of all needed evidential reasoning by a probabilistic Assumption-Based Truth Maintenance System (ATMS).

14. The system according to claim 11, wherein each kernel situation includes actions, and each set of actions in the kernel situation is grouped into situations which only interact with each other.

15. A factored envisionment engine comprising a processor programmed to perform a factored envisionment process comprising:
   constructing a plurality of kernel situations from complete situations of a system model, wherein each kernel diagram does not interact with any other kernel situation;
   invoking a conventional envisioner to process each constructed kernel situation individually, wherein the conventional envisioner sees only the kernel situation it is presently processing and the processing identifies any new combined kernel situations, wherein new combined kernel situations occur when, after being processed, at least two different kernel situations have an intersection and/or interaction;
   invoking the conventional envisioner to process each new combined kernel situation individually, wherein the envisioner sees only the new combined kernel situation it is processing, wherein the processing is repeated for all new combined kernel situations; and
   generating a factored envisioning graph including all processed kernel situations and new combined kernel situations.

16. The factored envisionment engine according to claim 15, wherein the kernel situations are determined dynamically, as all possible interactions cannot be determined a priori.

17. The factored envisionment engine according to claim 15, further including:
   representing ambiguities and performance of all needed evidential reasoning by a probabilistic Assumption-Based Truth Maintenance System (ATMS).

18. The factored envisionment engine according to claim 15, wherein in each kernel situation each set of actions is grouped into situations which only interact with each other.

* * * * *